Sept. 9, 1930.  E. KAUN  1,775,349
DASHPOT
Filed May 1, 1928

Inventor
Eugen Kaun
By his Attorney

Patented Sept. 9, 1930

1,775,349

UNITED STATES PATENT OFFICE

EUGEN KAUN, OF LINDELFINGEN, GERMANY, ASSIGNOR TO DAYTON SCALE COMPANY, OF DAYTON, OHIO, A CORPORATION OF NEW JERSEY

DASHPOT

Application filed May 1, 1928, Serial No. 274,266, and in Germany January 18, 1928.

This invention relates to damping devices for weighing scales or the like and more particularly to damping devices consisting of dash pots.

The oscillations of the movable elements of a scale set up upon the imposition or removal of a load from the scale are, as a rule, damped by connecting one or more of said movable parts to a dash pot device.

The dash pot cylinder is filled with a suitable fluid, preferably oil, and the piston moving in the fluid of said cylinder is connected to the movable scale part. It often happens that the sudden imposition or removal of a load causes the piston to move with a jerk through the fluid in the dash pot, tending to squirt said fluid violently through the opening in the cylinder head provided for the piston rod. As the loss of fluid changes the adjustment of the scale, it is desirable to prevent the squirting of fluid through the opening in the cylinder head.

The object of this invention is to provide means for preventing loss of the damping fluid through the cylinder head openings.

Various other objects and advantages of my invention will be obvious from the following particular description of one form of mechanism embodying the invention or from an inspection of the accompanying drawing; and the invention also constitutes certain new and novel features of construction and combination of parts hereinafter set forth and claimed.

Figure 1:
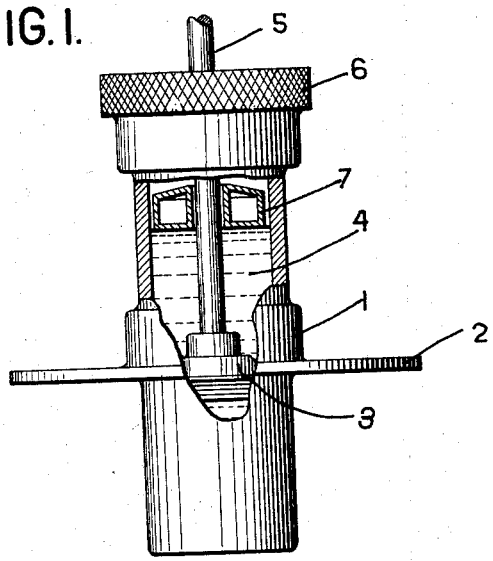
Fig. 1 is a part sectional view of the cylinder.
Figure 2:
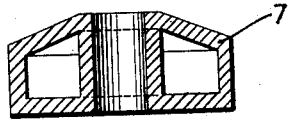
Fig. 2 is a section through the member comprising the essence of this invention and Fig. 3 is a top view of said member.
Figure 3:
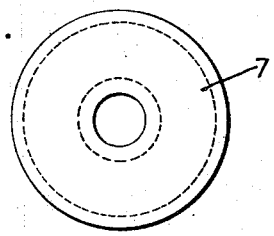

Referring to the drawings in detail, the dash pot comprises the cylinder 1 having a flange 2 for attaching the cylinder to the scale frame. A piston head 3 is movable through the fluid medium 4 for damping the oscillations of a movable weighing element (not shown) to which it is connected by the piston rod 5. The cylinder head 6 is provided with an opening for accommodating the piston rod 5.

With the above described construction, the sudden movement of the piston head 3 is apt to squirt some of the fluid 4 through the opening in the cylinder head 6. In order to prevent this action, a covering member 7 is provided which is of lower specific gravity than the fluid in order that it float on top of the fluid. The member 7 is fashioned as a hollow body, preferably of sheet metal although any other substance may be used so long as the specific gravity of the member 7 remains less than the specific gravity of the fluid.

The member 7 is made to cover as far as possible the whole surface of the fluid substance in the cylinder, although an adequate amount of play must be provided between the outer periphery of the member and the walls of the cylinder and the inner periphery of the member and the sides of the piston rod.

The top of member 7 is made to slope in this particular case towards the walls of the cylinder, in order that any oil which has forced its way between the covering member and the piston rod or cylinder walls will flow off the top of the member and return to the main body of oil.

The covering member resists any tendency of the fluid in the cylinder to move violently and confines the space between which the fluid may move so that the energy of the fluid will be spent before it reaches the opening in the cylinder head 6.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims.

I claim:

1. A dash pot mechanism comprising a cylinder containing liquid, a piston movable through said liquid, and a movable device for covering said liquid to prevent surging of said liquid upon sudden action of said piston.

2. A dash pot mechanism comprising a cylinder containing liquid, a piston movable therethrough, and a member floating on top of said liquid to prevent violent surging of said liquid.

3. A dash pot mechanism comprising a cylinder containing liquid, a piston movable through said liquid, and a hollow body freely floating on top of said liquid to prevent squirting thereof.

4. A dash pot device comprising a cylinder containing liquid, a piston in said cylinder under pressure of said liquid, and a member provided with a sloping top floating on top of said liquid.

5. A dash pot device comprising a cylinder containing fluid, a piston in said cylinder under pressure of said fluid, and a hollow body having a sloping top floating on top of said fluid.

6. A dash pot device comprising a cylinder containing fluid, a piston movable through said fluid, and a hollow annular body floating on top of said fluid and provided on the top with a conical surface.

In testimony whereof I hereto affix my signature.

EUG. KAUN.